US009395944B2

(12) United States Patent
Yamada

(10) Patent No.: US 9,395,944 B2
(45) Date of Patent: Jul. 19, 2016

(54) COMMUNICATION APPARATUS, CONTROL METHOD THEREOF, AND STORAGE MEDIUM

(75) Inventor: Tetsuya Yamada, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 142 days.

(21) Appl. No.: 13/069,299

(22) Filed: Mar. 22, 2011

(65) Prior Publication Data

US 2011/0238823 A1      Sep. 29, 2011

(30) Foreign Application Priority Data

Mar. 24, 2010  (JP) ................................. 2010-068287

(51) Int. Cl.

| | | |
|---|---|---|
| G06F 15/16 | (2006.01) | |
| H04L 12/50 | (2006.01) | |
| G06F 3/12 | (2006.01) | |
| H04L 29/12 | (2006.01) | |
| H04L 29/08 | (2006.01) | |

(52) U.S. Cl.

CPC .............. *G06F 3/1285* (2013.01); *G06F 3/122* (2013.01); *G06F 3/1215* (2013.01); *G06F 3/1231* (2013.01); *G06F 3/1203* (2013.01); *H04L 29/12028* (2013.01); *H04L 29/12226* (2013.01); *H04L 61/103* (2013.01); *H04L 61/2015* (2013.01); *H04L 67/025* (2013.01)

(58) Field of Classification Search

CPC ..... H04L 61/00; H04L 61/20; H04L 61/2038; H04L 61/2092; H04L 69/22; H04L 12/28; H04L 61/10; H04L 61/25; H04L 61/103; H04L 61/2015; H04L 63/0236; H04L 67/025; H04L 29/12028; G06F 3/1288; G06F 3/1293; G06F 3/122; G06F 3/1215; G06F 3/1231; G06F 3/1285; G06F 3/1203

USPC .......... 358/1.15; 709/222, 227; 370/474, 392, 370/357

See application file for complete search history.

(56) References Cited

U.S. PATENT DOCUMENTS

| | | | | |
|---|---|---|---|---|
| 5,353,412 A | * | 10/1994 | Douglas | ............ G06F 15/17381 370/408 |
| 5,361,363 A | * | 11/1994 | Wells | ....................... G06F 11/08 712/16 |
| 5,579,308 A | * | 11/1996 | Humpleman | .................. 370/352 |
| 5,886,732 A | * | 3/1999 | Humpleman | .................... 725/49 |
| 5,926,101 A | * | 7/1999 | Dasgupta | ................ H04L 45/00 340/2.81 |
| 5,940,387 A | * | 8/1999 | Humpleman | .................. 370/352 |
| 6,005,861 A | * | 12/1999 | Humpleman | ........... H04L 29/06 370/352 |
| 6,047,122 A | * | 4/2000 | Spiller | ................... G06F 9/4843 718/108 |
| 6,188,397 B1 | * | 2/2001 | Humpleman | .................... 725/80 |
| 6,314,476 B1 | * | 11/2001 | Ohara | .................... G06F 3/1203 709/202 |
| 6,341,127 B1 | * | 1/2002 | Katsube | .................. H04L 45/50 370/230 |
| 6,348,973 B1 | * | 2/2002 | Vatland | ................... H04L 69/26 358/1.1 |

(Continued)

FOREIGN PATENT DOCUMENTS

| | | |
|---|---|---|
| CN | 101039251 A | 9/2007 |
| JP | 2000-122944 A | 4/2000 |

*Primary Examiner* — Viet Vu
*Assistant Examiner* — Michael A Chambers
(74) *Attorney, Agent, or Firm* — Canon USA, Inc. IP Division

(57) ABSTRACT

An apparatus receives and analyzes a packet transmitted via a network, and performs network setting according to data included in the packet. Further, if it is determined that the received packet is a packet addressed to the apparatus and is not a setting packet for the network setting, the apparatus is controlled not to analyze the packet.

14 Claims, 11 Drawing Sheets

(56) References Cited

U.S. PATENT DOCUMENTS

| | | | | |
|---|---|---|---|---|
| 6,366,742 | B1* | 4/2002 | Reihl et al. | 399/12 |
| 6,493,874 | B2* | 12/2002 | Humpleman | H04Q 11/0478 348/E5.002 |
| 6,535,697 | B2* | 3/2003 | Reihl | G03G 15/0894 399/109 |
| 6,594,246 | B1* | 7/2003 | Jorgensen | H04L 1/20 370/338 |
| 6,862,103 | B1* | 3/2005 | Miura | G06Q 10/10 358/1.15 |
| 6,882,654 | B1* | 4/2005 | Nelson | H04L 43/18 370/392 |
| 6,925,126 | B2* | 8/2005 | Lan | H04N 21/25808 375/240 |
| 7,293,085 | B2* | 11/2007 | Isozu | H04L 67/16 709/224 |
| 7,373,412 | B2* | 5/2008 | Colas | H04L 45/742 709/227 |
| 7,406,513 | B2* | 7/2008 | Furukawa | H04L 29/12009 709/220 |
| 7,505,166 | B2* | 3/2009 | Han | G06F 3/1205 358/1.16 |
| 7,551,567 | B2* | 6/2009 | Anthias | H04L 69/22 370/252 |
| 7,577,155 | B2* | 8/2009 | Yamamoto | G06K 15/00 358/1.15 |
| 7,583,604 | B2* | 9/2009 | Couturier | H04L 43/12 370/241.1 |
| 7,742,183 | B2* | 6/2010 | Sato | G06K 15/00 358/1.13 |
| 7,792,113 | B1* | 9/2010 | Foschiano | H04L 12/4675 370/392 |
| 7,852,833 | B2* | 12/2010 | Horvath | H04W 36/0011 370/352 |
| 7,962,582 | B2* | 6/2011 | Potti | G06F 8/67 370/229 |
| 8,014,391 | B2* | 9/2011 | Maki | H04L 61/2015 370/389 |
| 8,055,741 | B2* | 11/2011 | Li | H04L 12/2859 709/220 |
| 8,144,347 | B2* | 3/2012 | Han | G06F 3/1205 358/1.14 |
| 8,284,688 | B2* | 10/2012 | Okada | H04L 41/5009 370/252 |
| 8,295,268 | B2* | 10/2012 | Tanaka | H04L 29/06027 370/351 |
| 8,619,793 | B2* | 12/2013 | Lavian | H04L 12/5693 370/252 |
| 2002/0110379 | A1* | 8/2002 | Reihl | G03G 15/0894 399/12 |
| 2002/0154328 | A1* | 10/2002 | Sato | G06K 15/00 358/1.13 |
| 2003/0101275 | A1* | 5/2003 | Maciel | H04L 29/06 709/235 |
| 2003/0105872 | A1* | 6/2003 | Han | H04L 63/083 709/229 |
| 2004/0008728 | A1* | 1/2004 | Lee | H04L 12/4633 370/474 |
| 2004/0017814 | A1* | 1/2004 | Shimada | H04L 29/1232 370/395.52 |
| 2004/0165213 | A1* | 8/2004 | Han | 358/1.15 |
| 2004/0179485 | A1* | 9/2004 | Terrier | H04L 1/1887 370/310 |
| 2004/0215819 | A1* | 10/2004 | Tsuruoka | H04L 45/10 709/238 |
| 2005/0047418 | A1* | 3/2005 | Kang | H04L 29/06 370/395.42 |
| 2005/0134893 | A1* | 6/2005 | Han | G06F 3/121 358/1.14 |
| 2005/0135893 | A1* | 6/2005 | Voss | B23B 31/1179 409/234 |
| 2005/0168769 | A1* | 8/2005 | Kim | G06F 21/608 358/1.14 |
| 2005/0172025 | A1* | 8/2005 | Colas | H04L 45/742 709/226 |
| 2005/0198344 | A1* | 9/2005 | Fujita | H04L 12/2807 709/231 |
| 2006/0133429 | A1* | 6/2006 | Seo | H04N 21/434 370/535 |
| 2006/0161667 | A1* | 7/2006 | Umesawa | H04L 63/0428 709/229 |
| 2006/0173965 | A1* | 8/2006 | Yang | H04L 12/5835 709/206 |
| 2006/0187919 | A1* | 8/2006 | Lee | H04L 45/742 370/389 |
| 2006/0221863 | A1 | 10/2006 | Ishimoto | |
| 2006/0238825 | A1* | 10/2006 | Han | H04N 1/32358 358/448 |
| 2006/0271969 | A1* | 11/2006 | Takizawa | H04W 74/0808 725/81 |
| 2007/0005737 | A1* | 1/2007 | Maki | H04L 67/34 709/222 |
| 2007/0025348 | A1* | 2/2007 | Nakashima | H04L 12/4641 370/389 |
| 2007/0058560 | A1 | 3/2007 | Sakai | |
| 2007/0118674 | A1* | 5/2007 | Ulenas | G06F 13/4045 710/305 |
| 2007/0127063 | A1* | 6/2007 | Fertlitsch | G06F 3/1203 358/1.15 |
| 2007/0189322 | A1* | 8/2007 | Hirose | H04W 8/245 370/447 |
| 2007/0216941 | A1 | 9/2007 | Jingu | |
| 2007/0237159 | A1* | 10/2007 | Yamada | H04L 12/2834 370/395.53 |
| 2007/0255883 | A1* | 11/2007 | Ulenas | G06F 13/387 710/313 |
| 2008/0043688 | A1* | 2/2008 | Igarashi | H04L 12/2602 370/338 |
| 2008/0077705 | A1* | 3/2008 | Li | H04L 47/10 709/236 |
| 2008/0098458 | A2* | 4/2008 | Smith | H04L 12/4679 726/3 |
| 2008/0147776 | A1* | 6/2008 | Inoue | H04L 29/12066 709/202 |
| 2008/0266603 | A1* | 10/2008 | Han | 358/1.15 |
| 2009/0190523 | A1* | 7/2009 | Ohgushi | H04W 8/12 370/328 |
| 2009/0252147 | A1* | 10/2009 | Zhang | G06F 3/0611 370/351 |
| 2010/0228896 | A1* | 9/2010 | Park | G06F 13/426 710/36 |
| 2010/0238921 | A1* | 9/2010 | Karino | H04L 45/60 370/389 |
| 2010/0257384 | A1* | 10/2010 | Tsai | G06F 1/3209 713/310 |

* cited by examiner

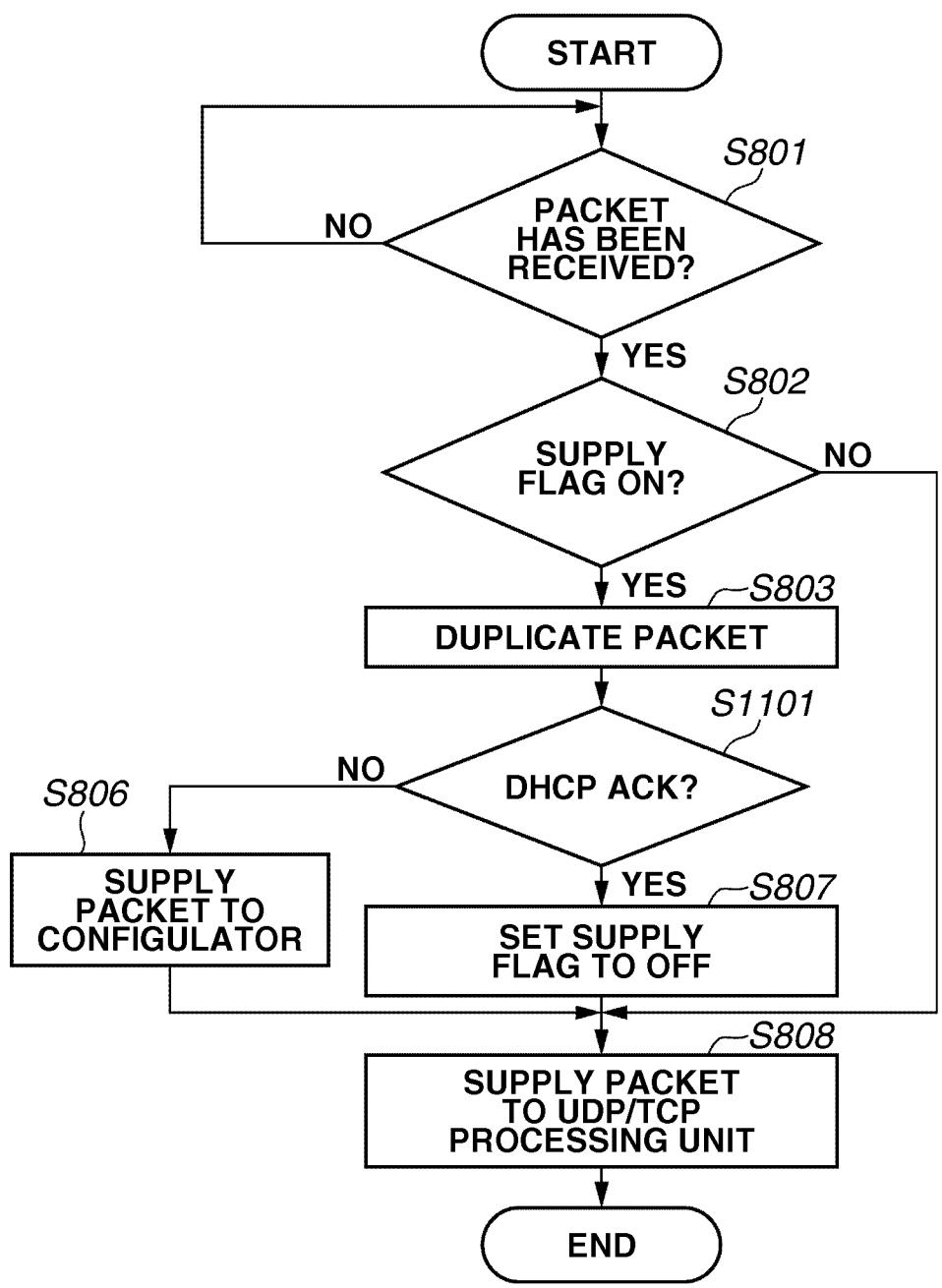

a
COMMUNICATION APPARATUS, CONTROL METHOD THEREOF, AND STORAGE MEDIUM

BACKGROUND OF THE INVENTION

1. Field of the Invention

The present invention relates to a communication apparatus that can be connected to a network.

2. Description of the Related Art

Various conventional communication apparatuses have been widely known that are connected to networks such as a local area network (LAN) and the Internet to communicate with external apparatuses on the networks.

A protocol widely used for the communication apparatus to be connected to the network is an internet protocol. The internet protocol allocates an address (internet protocol (IP) address) unique to each apparatus so that the apparatuses can identify each other using the IP address. When a communication apparatus is connected to the network in order to put the apparatus into a usable state, various types of network settings including IP address setting are to be performed.

Conventionally, a manager has operated an operation unit of the communication apparatus to input each value to be set thereto. However, in recent years, network setting for the communication apparatus can be remotely performed from an external apparatus connected thereto via the network. For example, according to a method discussed in Japanese Patent Application No. 2000-122944, a setting packet is transmitted from a network management apparatus to a network device, and the network setting for the network device can be remotely performed.

More specifically, firstly, the network management apparatus transmits a search packet to a media access control (MAC) address which means broadcast transmission as a destination. Upon receiving a response packet from the network device that has received the search packet, the network management apparatus acquires the MAC address of the network device from the response packet. The network management apparatus transmits each value to be set for the network device to the acquired MAC address as a destination. The network device that has received the transmitted value sets the each value specified by the network management apparatus to the own apparatus and completes the network setting.

However, a following issue arises when the setting packet transmitted via the network is received and the network setting for the communication apparatus is performed according to data included in the setting packet.

Conventionally, when the network setting is remotely performed using the setting packet, the communication apparatus subjected to setting has analyzed all packets (to the MAC address of the own apparatus or the MAC address meaning the broadcast transmission) received via the network. That is because, in order to enable the network setting to be performed remotely from a state in which no IP address is set, the packet in a layer lower than that in which the IP address is treated is to be received and whether the received packet is the setting packet is to be determined.

However, once the network setting is completed, the setting packet does not need to be processed, and thus it is not necessary to determine whether the packet received via the network is the setting packet. Nevertheless, for the conventional apparatus, even after the network setting has been completed, all packets received via the network have been analyzed to determine whether the packets have been the setting packets. Accordingly, due to analysis of the packets, a processing load of the communication apparatus has been increased, thereby causing delay of other various types of processing such as drawing processing on an operation screen, printing processing, and image conversion processing.

SUMMARY OF THE INVENTION

According to an aspect of the present invention, an apparatus includes a reception unit configured to receive a packet that is transmitted via a network, a setting unit configured to analyze the received packet and perform network setting for the apparatus according to data included in the received packet, a first determination unit configured to determine whether the received packet is a packet addressed to the apparatus, a second determination unit configured to determine whether the received packet is a setting packet for the network setting to be performed, and a control unit configured to, if the received packet is the packet addressed to the apparatus and is not the setting packet, control the setting unit not to analyze the packet.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 11 is a flowchart illustrating a series of processing performed by a configurator control unit according to an exemplary embodiment of the present invention.

DESCRIPTION OF THE EMBODIMENTS

Various exemplary embodiments, features, and aspects of the invention will be described in detail below with reference to the drawings.

All combinations of features illustrated in exemplary embodiments are not necessarily essential for means to solve the issue in the invention.

Figure 1:
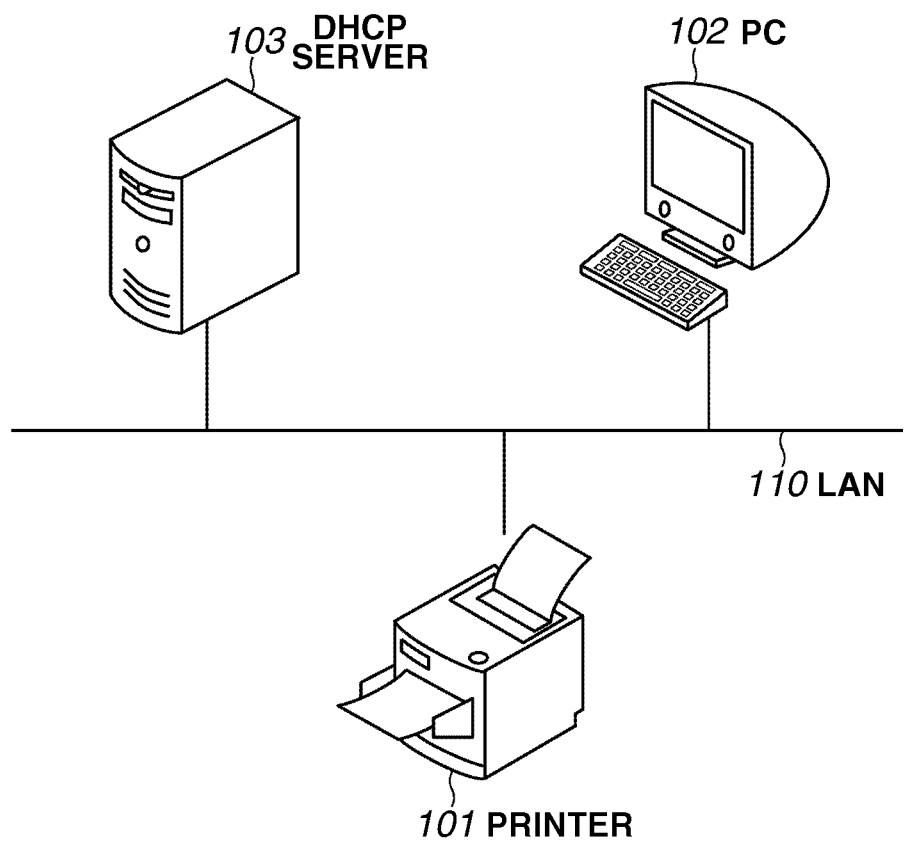
FIG. 1 illustrates an entire communication system according to an exemplary embodiment of the present invention.

FIG. 1 illustrates an entire communication system according to a first exemplary embodiment of the present invention. A printer 101 can be connected to a local area network (LAN) 110 and can communicate with a personal computer (PC) 102 and a DHCP server 103 via the LAN 110. Other external apparatuses (not illustrated) are connected to the LAN 110, and the printer 101 can communicate with these external apparatuses.

Figure 2:
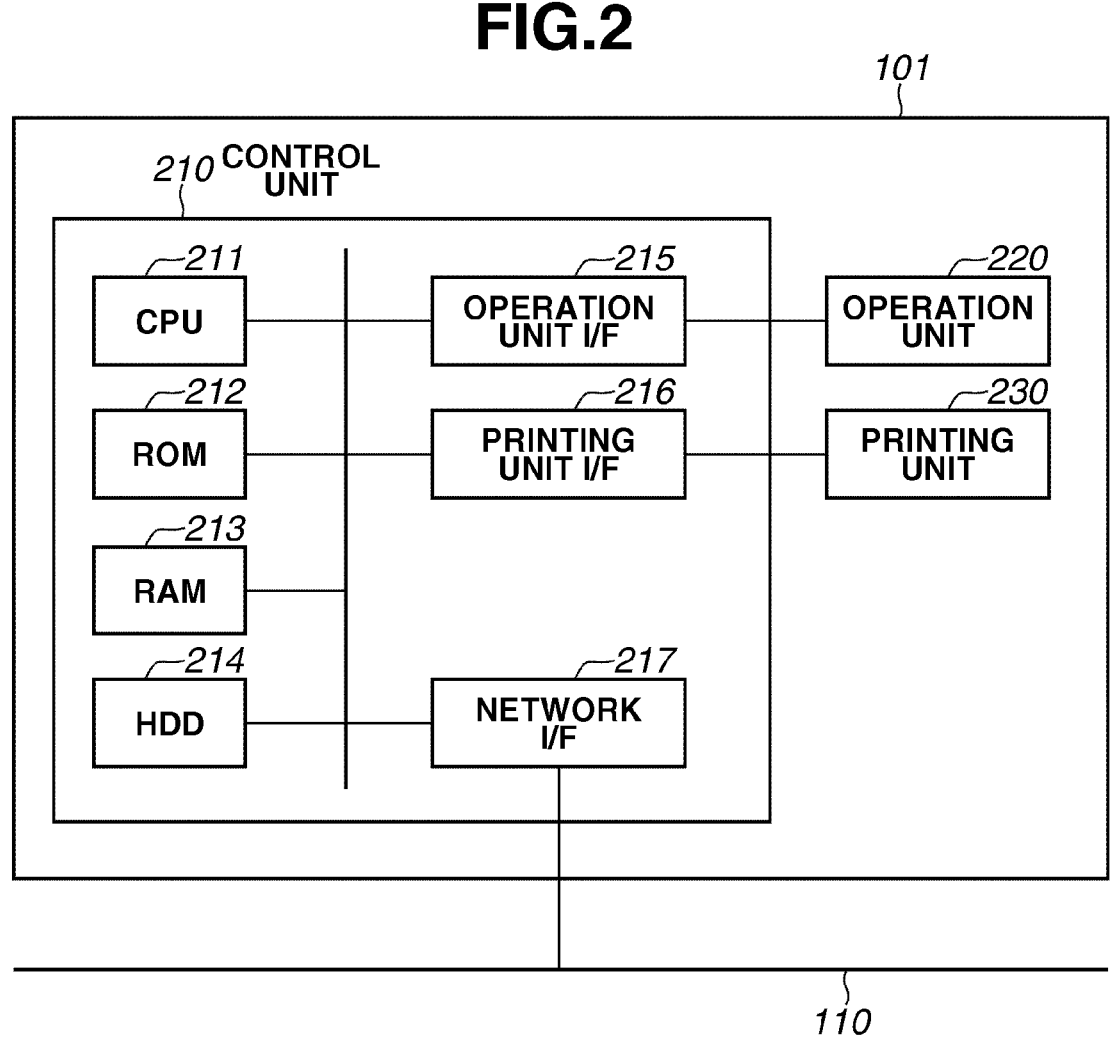
FIG. 2 is a block diagram illustrating a hardware configuration of a printer according to an exemplary embodiment of the present invention.

FIG. 2 is a block diagram illustrating a hardware configuration of the printer 101. A control unit 210 including a central processing unit (CPU) 211 controls an entire operation of the printer 101. The CPU 211 reads a control program stored in a read only memory (ROM) 212 to perform various types of control such as reading control and transmission control. A random access memory (RAM) 213 is used as a main memory of the CPU 211 and a temporary storage region of a working area.

A hard disk (HDD) 214 stores image data and various types of programs. An operation unit interface (I/F) 215 connects an operation unit 220 with the control unit 210. The operation unit 220 includes a keyboard and a liquid crystal display unit having a touch panel function.

A printing unit I/F 216 connects a printing unit 230 with the control unit 210. Image data to be printed by the printing unit 230 is transferred from the control unit 210 via the printing unit I/F 216 and printed on a recording medium thereby.

A network I/F 217 connects the control unit 210 (the printer 101) to the LAN 110. The network I/F 217 performs communication control for transmitting the image data and various types of information to the external apparatuses (including the PC 102 and the DHCP server 103) via the LAN 110 and receiving the image data and various types of information from the external apparatuses via the LAN 110. The printer 101 may be a multifunction peripheral (MFP) further including a reading unit that reads an image on a document to generate the image data.

Figure 3:
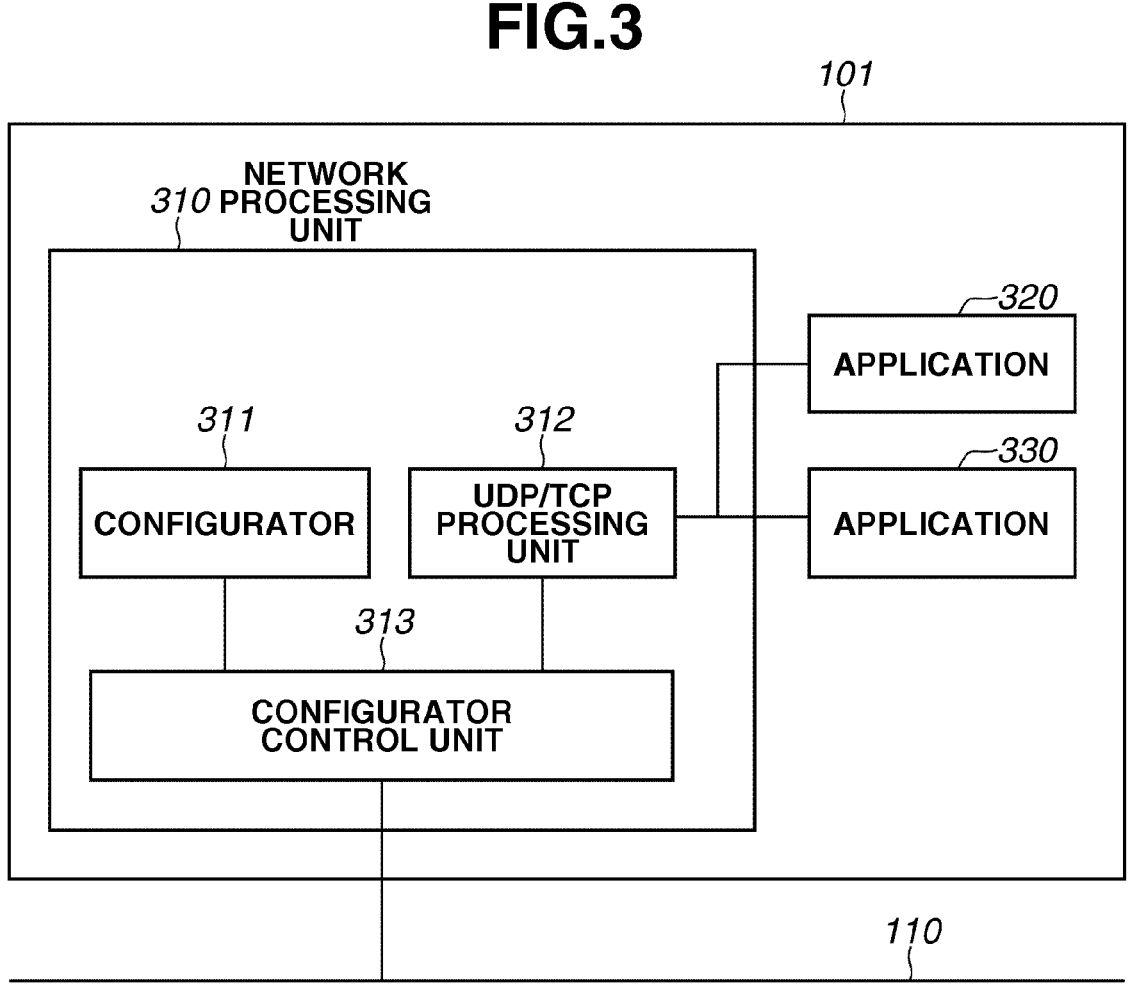
FIG. 3 is a block diagram illustrating a software configuration of a printer according to an exemplary embodiment of the present invention.

FIG. 3 is a block diagram illustrating a software configuration of the printer 101. A packet that is transmitted from the outside via the LAN 110 and received by the network I/F 217 is processed by a network processing unit 310. The packet to be processed by the network processing unit 310 includes a MAC address (physical address) of the network I/F 217 (the printer 101) specified as a destination or a MAC address meaning the broadcast transmission specified as a destination. A packet other than the packets described above is discarded without being transferred to the network processing unit 310.

A configurator control unit 313 duplicates the packet input into the network processing unit 310 and supplies the packets to each of a configurator 311 and a user datagram protocol (UDP)/transmission control protocol (TCP) processing unit 312. However, when the supply of the packet to the configurator 311 is stopped as described below, the input packet is supplied (transferred) only to the UDP/TCP processing unit 312 without being duplicated.

The configurator 311 analyzes the received packet to determine whether the received packet is a setting packet for network setting for the printer 101 and performs the network setting for the printer 101 when the received packet is determined as the setting packet.

Figure 4:
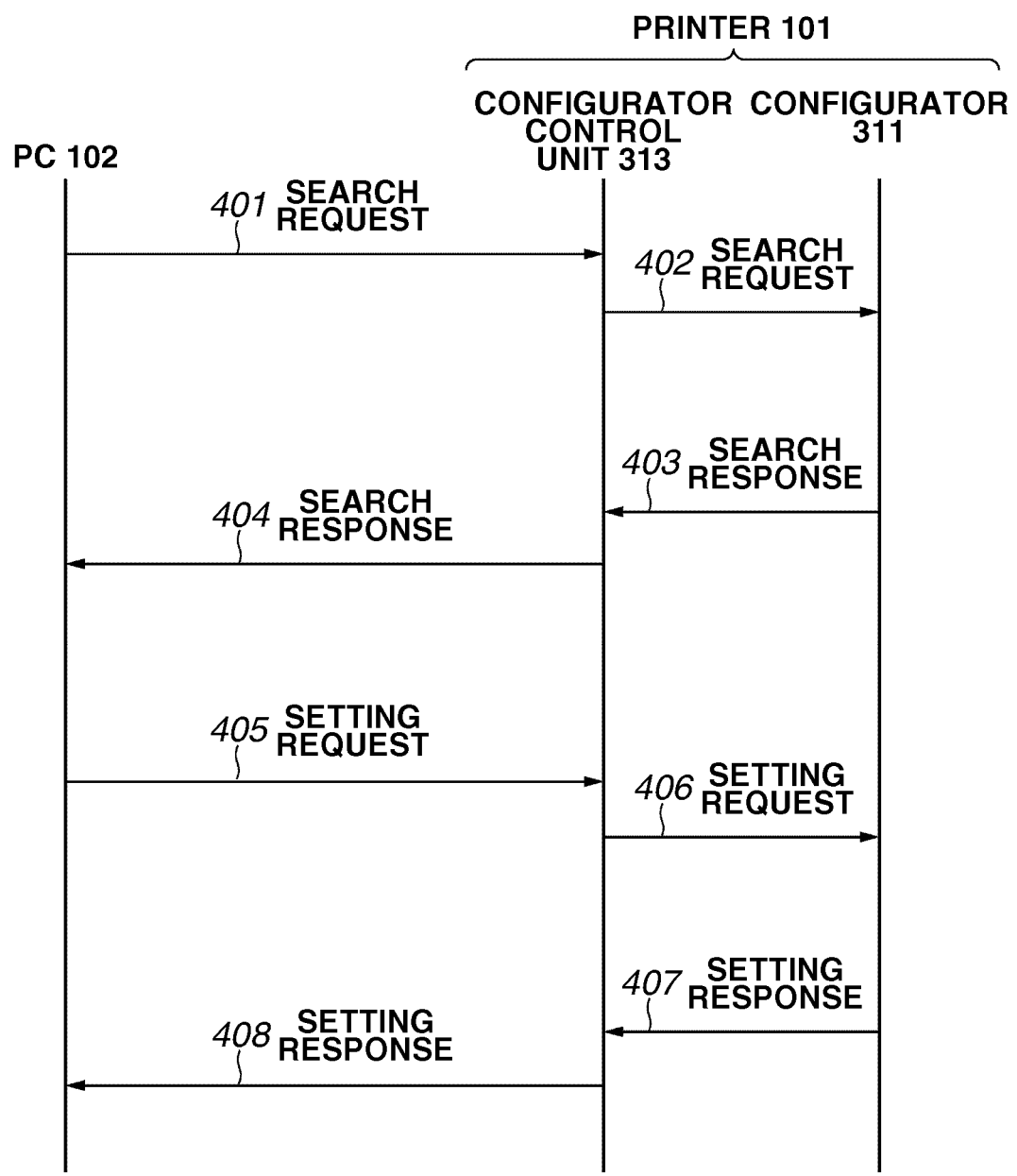
FIG. 4 is a sequence diagram illustrating processing for remotely performing network setting of a printer from a personal computer (PC) according to an exemplary embodiment of the present invention.

FIG. 4 is a sequence diagram illustrating processing for remotely performing the network setting for the printer 101 from the PC 102. When the network setting is performed on the printer 101 in which no IP address has been set, firstly, the PC 102 performs broadcast transmission of a search request 401 illustrated in FIG. 5.

Figure 5:
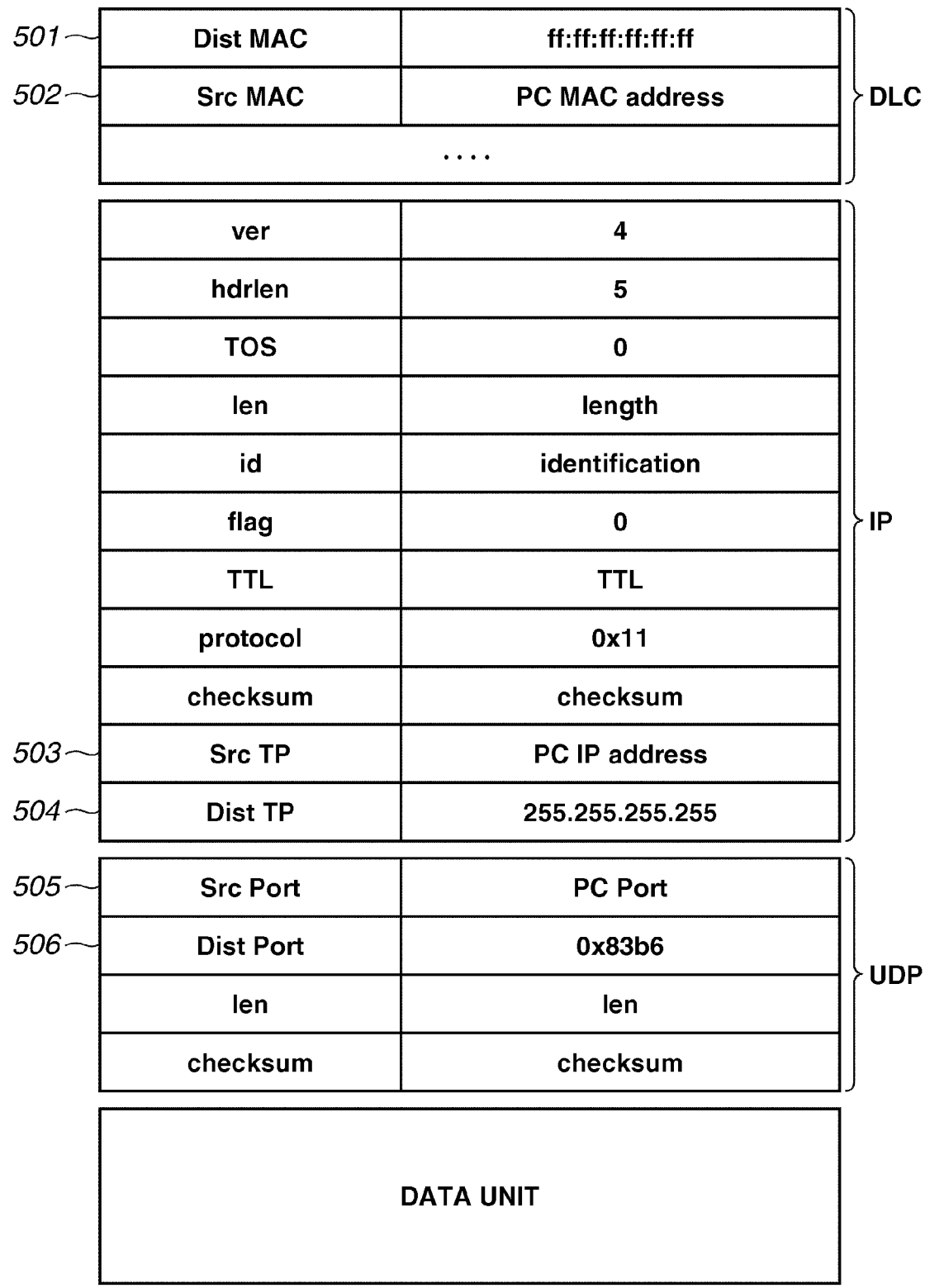
FIG. 5 illustrates contents of a search request according to an exemplary embodiment of the present invention.

As illustrated in FIG. 5, for a destination MAC address 501 of the search request 401, "ff:ff:ff:ff:ff:ff" that means the broadcast transmission is specified. For a transmission source MAC address 502 of the search request 401, the MAC address allocated to the network I/F of the PC 102 is specified.

For a destination IP address 504 of the search request 401, "255.255.255.255" that means the broadcast transmission is specified. For a transmission source IP address 503 of the search request 401, the IP address allocated to the network I/F of the PC 102 is specified.

For a destination port 506 of the search request 401, "0*83b6" for identifying that this packet is the setting packet for the network setting to be performed by the configurator 311 is specified. For a transmission source port 505 of the search request 401, port information to be used by the PC 102 is specified.

The search request 401 includes a data unit following a data link control (DLC) header, an IP header, and a UDP header. A setting request 405 described below describes each value to be set for the printer 101 in the data unit.

Upon receiving the search request 401, the configurator control unit 313 duplicates the received search request 401 and supplies one of the search requests 401 to the configurator 311 and another to the UDP/TCP processing unit 312. FIG. 4 illustrates that the search request 402 is supplied (transferred) only to the configurator 311, however along with the transfer of the search request 402 to the configurator 311, the search request 402 is also transferred to the UDP/TCP processing unit 312.

Upon receiving the search request 402, the configurator 311 analyzes a part of or all of the DLC header, the IP header, the UDP header, and the data unit of the received packet to determine the contents of the packet. As a result, when the configurator 311 determines that the received packet is the search request, the configurator 311 transmits a search response 403 in response to the search request 402. The search response 403 is transferred to the PC 102 as a search response 404 via the configurator control unit 313.

Figure 6:
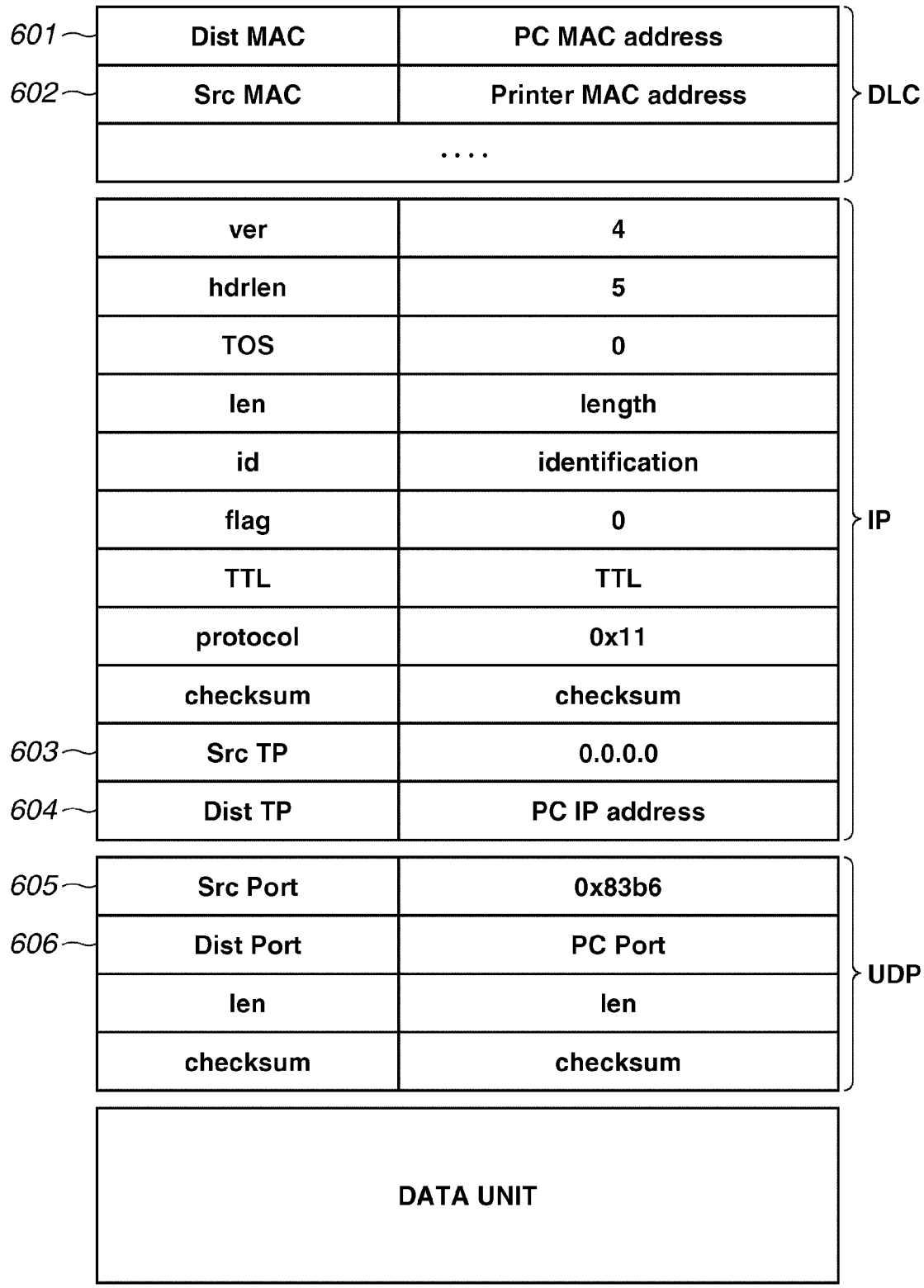
FIG. 6 illustrates contents of a search response according to an exemplary embodiment of the present invention.

FIG. 6 illustrates the search response 404. For a destination MAC address 601 of the search response 404, the MAC address (specified as the transmission source MAC address 502 of the search request 401) allocated to the network I/F of the PC 102 is specified. For a transmission source MAC address 602 of the search response 404, the MAC address allocated to the network I/F 217 of the printer 101 is specified.

For a destination IP address 604 of the search response 404, the IP address allocated to the network I/F of the PC 102 is specified. For a transmission source IP address 603 of the search response 404, "0.0.0.0" which is set for the printer 101 as an initial value (factory shipping value) of the IP address is specified.

For a destination port 606 of the search response 404, port information to be used by the PC 102 is specified. For a transmission source port 605 of the search response 404, "0*83b6" specified as the destination port 506 of the search request 401 is specified.

The search response 404 includes a data unit following the DLC header, the IP header, and the UDP header.

Upon receiving the search response 404, the PC 102 transmits to the printer 101 the setting request 405 including the data unit in which each value to be set for the printer 101 is described. In the setting request 405, the MAC address that is specified in the transmission source MAC address 602 of the search response 404 and allocated to the network I/F 217 of the printer 101 is specified as the destination MAC address.

Upon receiving the setting request 405, the configurator control unit 313 duplicates the received setting request 405, and supplies one of the setting requests 405 to the configurator 311 and another to the UDP/TCP processing unit 312. FIG. 4 illustrates that the setting request 406 is supplied (transferred) only to the configurator 311, however along with the transfer of the setting request 406 to the configurator 311, the setting request 406 is also transferred to the UDP/TCP processing unit 312.

Upon receiving the setting request 406, the configurator 311 analyzes a part of or all of the DLC header, the IP header, the UDP header, and the data unit of the received packet to discriminate the contents of the packet. As a result, when the configurator 311 determines that the received packet is the setting request, based on each value described in the data unit of the setting request 406, the configurator 311 performs the network setting for the printer 101.

After the network setting is completed, the configurator 311 transmits a setting response 407 for notifying the PC 102 of the completion of the network setting. The setting response 407 is transferred to the PC 102 as a setting response 408 via the configurator control unit 313.

By the processing described above, the network setting can be remotely performed from the PC 102 on the printer 101 in which the network setting is not performed (no IP address has been set).

Figure 7:
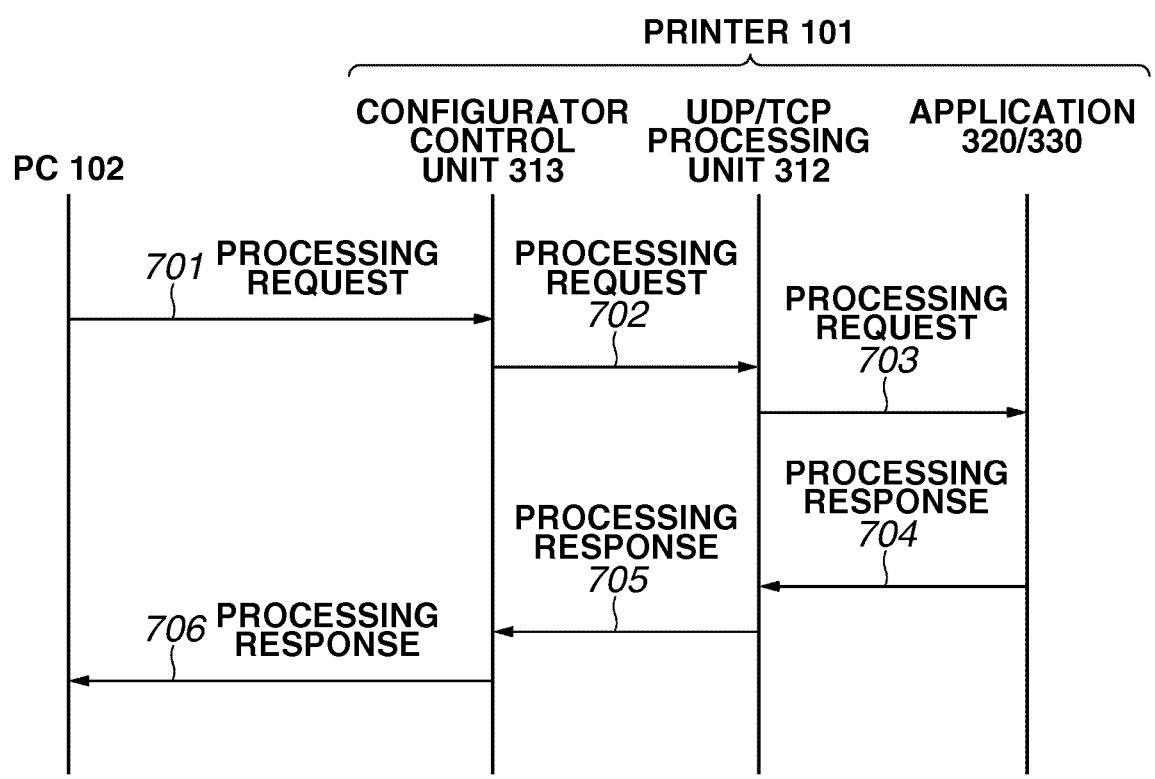
FIG. 7 is a sequence diagram illustrating processing in which an arbitrary application in a PC communicates with an application in a printer according to an exemplary embodiment of the present invention.

FIG. 7 is a sequence diagram illustrating processing in which an arbitrary application in the PC 102 communicates with an application 320 or 330 in the printer 101. In order to enable the application 320 or 330 to communicate with the external apparatus on the LAN 110, the network setting (including setting of the IP address) for the printer 101 is to be completed.

Firstly, the PC 102 transmits a processing request 701 to the printer 101. For a destination MAC address of the processing request 701, the MAC address allocated to the network I/F 217 of the printer 101 is specified. For a transmission source MAC address of the processing request 701, the MAC address allocated to the network I/F of the PC 102 is specified.

For a destination IP address of the processing request 701, the IP address set for the network I/F 217 (the printer 101) according to the sequence illustrated in FIG. 4 is specified. For a transmission source IP address of the processing request 701, the IP address allocated to the network I/F of the PC 102 is specified.

For a destination port of the processing request 701, port information for identifying the application 320 or the application 330 is specified. For a transmission source port of the processing request 701, port information to be used by the PC 102 is specified.

Upon receiving the processing request 701, the configurator control unit 313 duplicates the received processing request 701, and supplies one of the processing requests 701 to the configurator 311 and another to the UDP/TCP processing unit 312. FIG. 7 illustrates that the processing request 702 is supplied (transferred) only to the UDP/TCP processing unit 312, however, along with the transfer of the processing request 702 to the UDP/TCP processing unit 312, the processing request 702 is also transferred to the configurator 311.

Upon receiving the processing request 702, the UDP/TCP processing unit 312 analyzes the IP header and the UDP header of the received packet to specify the application to be the destination to which the packet is transferred. A processing request 703 is transferred to the specified application 320 or 330.

The application 320 or 330 that has received the processing request 703 performs processing and transmits a processing result as a processing response 704. The processing response 704 is transferred to the configurator control unit 313 as a processing response 705 via the UDP/TCP processing unit 312. The configurator control unit 313 that has received the processing response 705 transmits a processing response 706 to the PC 102.

By the processing described above, after the network setting is performed (the IP address is set), the application 320 or 330 of the printer 101 can communicate with the external apparatuses on the LAN 110.

After the network setting for the printer 101 is completed, the configurator control unit 313 has no opportunities to process the setting packet. Nevertheless, the conventional apparatus supplies (transfers) all packets received by the network processing unit 310 to the configurator 311 after the network setting is completed.

More specifically, the configurator 311 analyzes all packets received by the network processing unit 310, thereby generating a great load of the printer 101 (control unit 210). The load causes delay of other various types of processing (such as drawing processing on an operation screen, printing processing, and image conversion processing) performed by the printer 101 (control unit 210).

Thus, according to the first exemplary embodiment, when the packet that is addressed to the printer 101 and is not the setting packet for the network setting to be performed by the configurator 311 is received, the supply of the received packet to the configurator 311 is stopped.

When the packet is transmitted to the printer 101 from the external apparatus on the LAN 110, the MAC address as the destination should be known. However, normally, the application in the external apparatus specifies the destination with the IP address. Thus, the external apparatus performs broadcast transmission of an address resolution protocol (ARP) request, which is regulated by Request for Comments (RFC) 826, to inquire the IP address specified by the application.

When the IP address specified by the ARP request corresponds to the IP address set for the own apparatus, the printer 101 that has received the ARP request returns the MAC address of the own apparatus as a response. The external apparatus can find the MAC address of the printer 101 by the response from the printer 101.

On the other hand, when the appropriate network setting is not performed on the printer 101, the printer 101 does not respond to the ARP request. Therefore, the external apparatus cannot acquire the MAC address of the printer 101. In other words, when the packet (except for the setting packet for the network setting to be performed by the configurator 311) including the MAC address of the printer 101 as the destination is transmitted, it is determined that the network setting for the printer 101 has been completed.

Thus, according to the first exemplary embodiment, when the packet that is addressed to the printer 101 and is not the setting packet for the network setting to be performed by the configurator 311 is received, it is determined that the network setting has been completed. In this case, by stopping the supply of the received packet to the configurator 311, it can be set so that the configurator 311 does not analyze the packet, and thus the processing load of the printer 101 (control unit 210) can be reduced.

Figure 8:
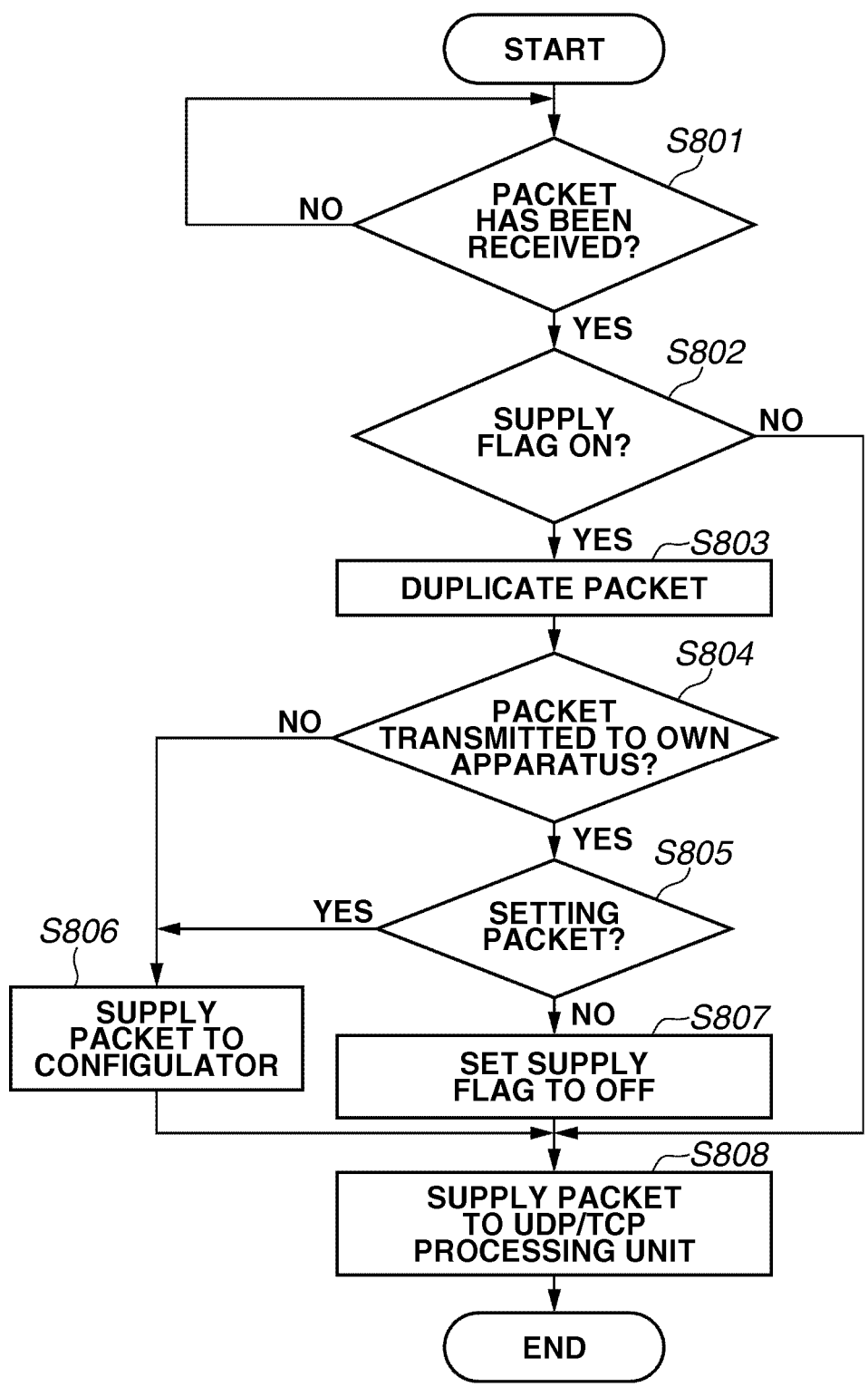
FIG. 8 is a flowchart illustrating a series of processing performed by a configurator control unit according to an exemplary embodiment of the present invention.

FIG. 8 is a flowchart illustrating a series of processing performed by the configurator control unit 313 to stop the supply of the packet to the configurator 311. Each operation described in the flowchart illustrated in FIG. 8 can be realized when the CPU 211 of the printer 101 executes the control program. Further, the processing in the flowchart illustrated in FIG. 8 starts when a power supply of the printer 101 is turned on.

In step S801, it is determined whether a packet has been received. When the packet has been received (YES in step S801), the processing proceeds to step S802. If not (NO in step S801), the processing waits in step S801 until the packet is received.

In step S802, whether to supply the packet to the configurator 311 is determined by determining whether a supply flag is set to ON or OFF. After the power supply of the printer 101 is turned on, since the supply of the packet to the configurator 311 is not stopped, the supply flag is set to ON. However, in step S807 that will be described below, when the supply of the packet to the configurator 311 is stopped, the supply flag is set to OFF.

If the supply of the packet to the configurator 311 is stopped in step S807, when the power supply of the printer 101 is once turned off and then turned on again, the supply flag is returned to the ON state. Therefore, by turning on the power supply of the printer 101 again, the supply of the packet to the configurator 311 can be resumed. With this arrangement, the network setting using the configurator 311 can be changed.

As a result of the determination in step S802, if it is determined that the packet is to be supplied to the configurator 311 (YES in step S802), the processing proceeds to step S803. On the other hand, if it is determined that the packet is not to be supplied to the configurator 311 (NO in step S802), the processing proceeds to step S808 and the received packet is supplied (transferred) only to the UDP/TCP processing unit 312. In this case, the supply (transfer) of the packet to the configurator 311 is not performed.

In step S803, the received packet is duplicated. In the following step S804, it is determined whether the received packet is addressed to the own apparatus (printer 101). When the destination MAC address of the received packet corresponds to the MAC address allocated to the network I/F 217 of the printer 101, it is determined that the received packet is addressed to the own apparatus (YES in step S804). On the other hand, when the destination MAC address means the broadcast transmission, it is determined that the received packet is not addressed to the own apparatus (NO in step S804).

As a result of the determination in step S804, if it is determined that the received packet is not addressed to the own apparatus (NO in step S804), then in step S806, the received packet is supplied (transferred) to the configurator 311, and in step S808, the received packet is further supplied (transferred) to the UDP/TCP processing unit 312.

As a result of the determination in step S804, if it is determined that the received packet is addressed to the own apparatus (YES in step S804), the processing proceeds to step S805. In step S805, it is determined whether the received packet is the setting packet (e.g., the setting request 405) for the network setting to be performed by the configurator 311. The configurator control unit 313 previously stores "0*83b6" that is identification information (port information) for identifying the setting packet. When it is determined that the port information included in the received packet corresponds to "0*83b6" that is stored in the configurator control unit 313, it is determined that the received packet is the setting packet.

As a result of the determination in step S805, if it is determined that the received packet is the setting packet (YES in step S805), then in step S806, the received packet is supplied (transferred) to the configurator 311, and in step S808, the received packet is further supplied (transferred) to the UDP/TCP processing unit 312.

As a result of the determination in step S805, if it is determined that the received packet is not the setting packet (NO in step S805), the processing proceeds to step S807 and the supply flag is set to OFF. Accordingly, the supply (transfer) of the received packet to the configurator 311 is stopped. The processing, then, proceeds to step S808 and supplies (transfers) the received packet only to the UDP/TCP processing unit 312. In this case, since the supply (transfer) of the packet to the configurator 311 is not performed, the duplicated packet is discarded.

By the processing described above, it can be set so that the configurator 311 does not analyze the received packet, when it is determined that the network setting has been completed. With this arrangement, the processing load of the printer 101 (control unit 210) can be reduced.

Next, a second exemplary embodiment of the present invention will be described. The printer 101 that will be described in the second exemplary embodiment can perform not only the network setting by the configurator 311 but also the network setting using a dynamic host configuration protocol (DHCP).

When the network setting is performed using the DHCP, the printer 101 communicates with an external server (a DHCP server 103). When a DHCP acknowledgment (ACK) included in a command group used by the DHCP is received, it is determined that the network setting for the printer 101 has been completed (actually, just about to be completed), and the supply of the packet to the configurator 311 is stopped. In the present exemplary embodiment, the same numeral reference is given to the configuration similar to that in the first exemplary embodiment described above, and detailed description thereof will not be repeated.

Figure 9:
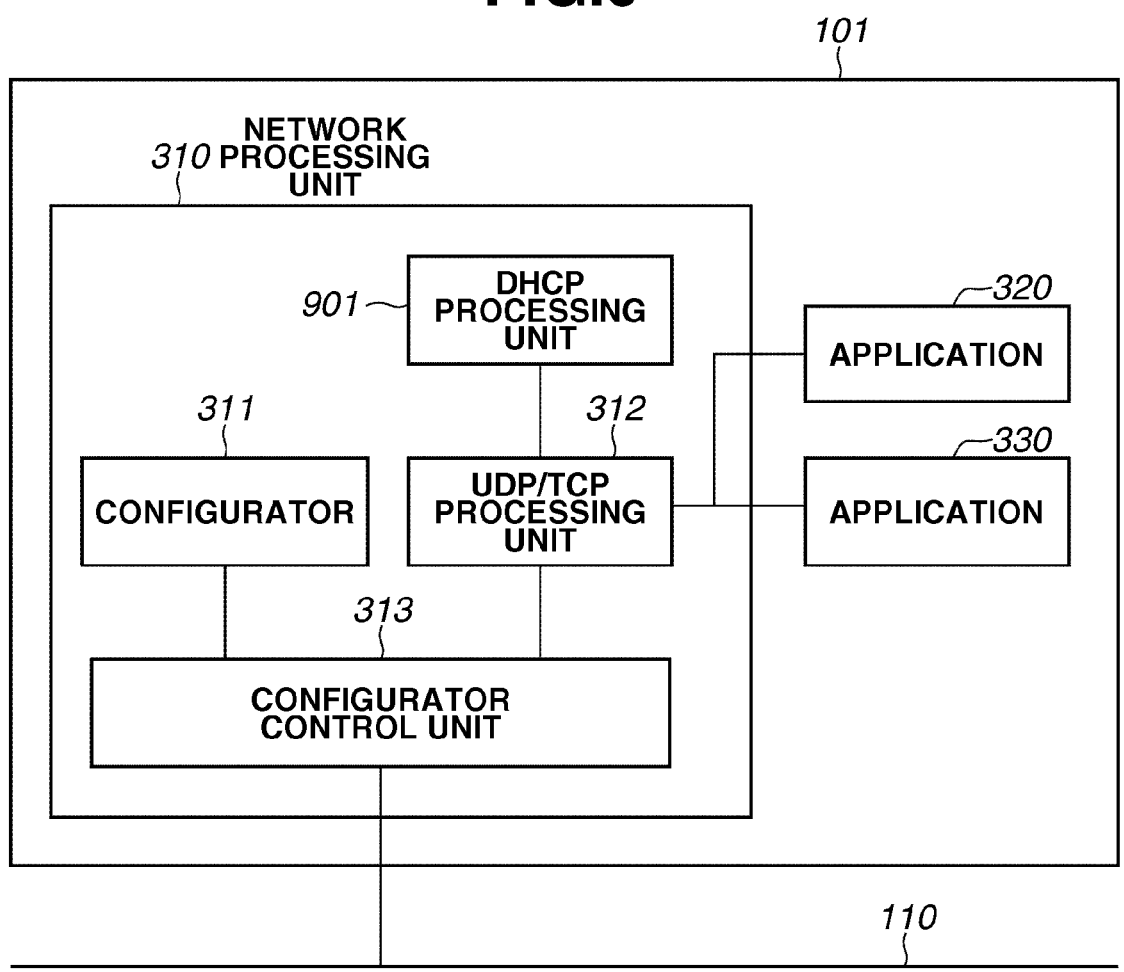
FIG. 9 is a block diagram illustrating a software configuration of a printer according to an exemplary embodiment of the present invention.

FIG. 9 illustrates a software configuration of the printer 101. Compared with the software configuration illustrated in FIG. 3, a DHCP processing unit 901 is newly provided in the present exemplary embodiment. The DHCP processing unit 901 performs the network setting for the printer 101 using the DHCP that is different from the protocol used by the configurator 311.

Figure 10:
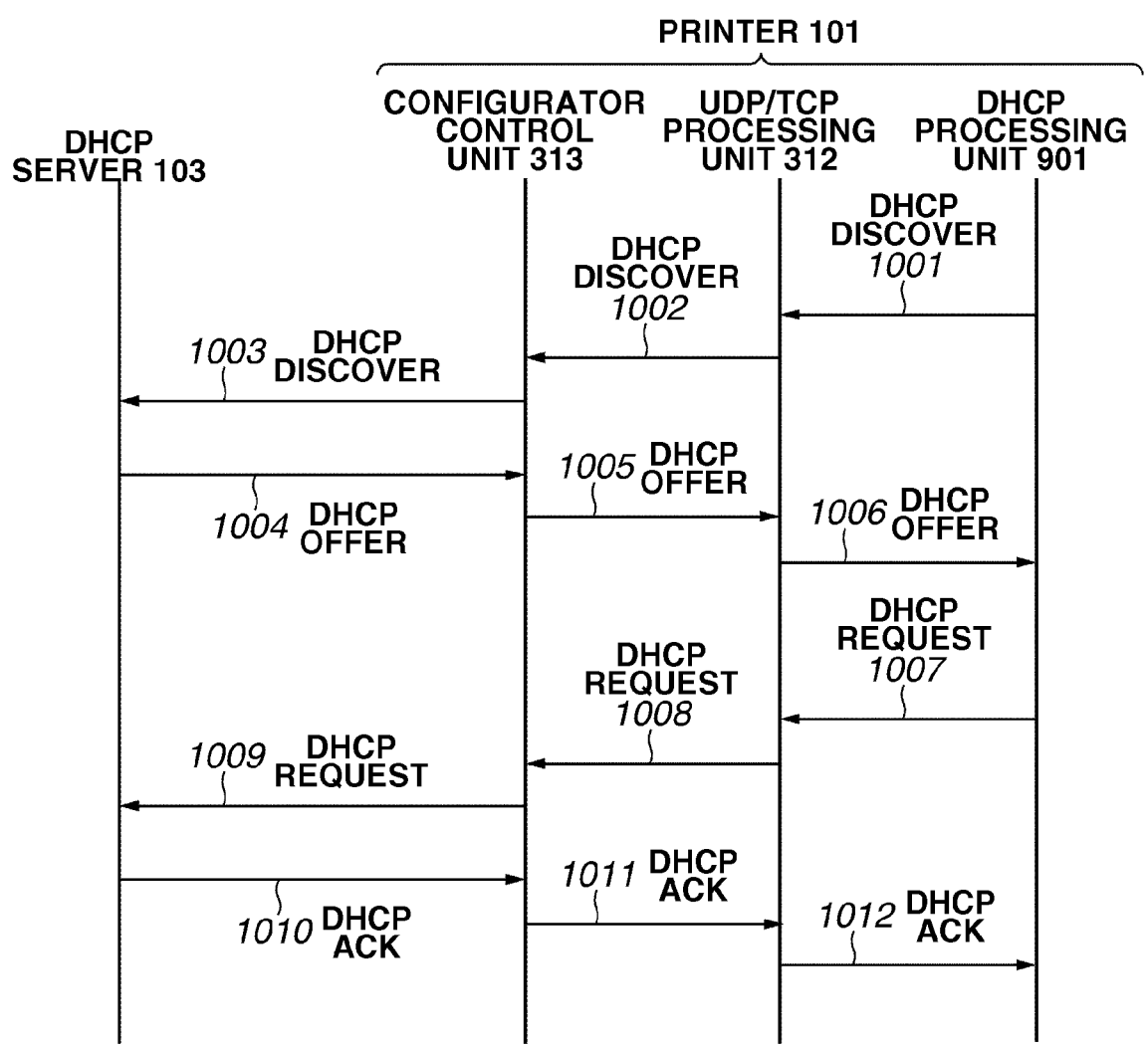
FIG. 10 is a sequence diagram illustrating processing for performing network setting for a printer using a dynamic host configuration protocol (DHCP) according to an exemplary embodiment of the present invention.

FIG. 10 is a sequence diagram illustrating processing for performing network setting for the printer 101 using the DHCP.

Firstly, the DHCP processing unit 901 transmits a DHCP DISCOVER 1001 to the UDP/TCP processing unit 312. The UDP/TCP processing unit 312 transfers the received DHCP DISCOVER 1001 to the configurator control unit 313 as a DHCP DISCOVER 1002. The configurator control unit 313 performs broadcast transmission of the received DHCP DISCOVER 1002 to the LAN 110 as a DHCP DISCOVER 1003.

Upon receiving the DHCP DISCOVER 1003, the DHCP 103 transmits a DHCP OFFER 1004 which describes a candidate of a value (IP address) that can be set to the printer 101 as a response.

The configurator control unit 313 that has received the DHCP OFFER 1004 duplicates the received DHCP OFFER 1004, and supplies one of the DHCP OFFERs 1004 to the configurator 311 and another to the UDP/TCP processing unit 312. FIG. 10 only illustrates that a DHCP OFFER 1005 is supplied (transferred) to the UDP/TCP processing unit 312. However, along with the transfer of the DHCP OFFER 1005 to the UDP/TCP processing unit 312, the DHCP OFFER 1005 is also transferred to the configurator 311.

The UDP/TCP processing unit 312 transfers the received DHCP OFFER 1005 to the DHCP processing unit 901 as a DHCP OFFER 1006. If candidates included in the DHCP OFFER 1006 include a value that has been used in the past, the value is selected. If the candidates do not include the value that has been used in the past, an arbitrary value is selected according to a predetermined condition.

In order to notify the DHCP server 103 of the selected value, a DHCP REQUEST 1007 is transmitted to the UDP/TCP processing unit 312. The UDP/TCP processing unit 312 transfers the received DHCP REQUEST 1007 to the configurator control unit 313 as a DHCP REQUEST 1008. The configurator control unit 313 performs broadcast transmission of the received DHCP REQUEST 1008 to the LAN 110 as a DHCP REQUEST 1009.

The DHCP server 103 that has received the DHCP REQUEST 1009 checks the value selected by the DHCP processing unit 901 and transmits a DHCP ACK 1010 to the printer 101 as a response.

The configurator control unit 313 that has received the DHCP ACK 1010 transfers a DHCP ACK 1011 to the UDP/TCP processing unit 312.

The UDP/TCP processing unit 312 transfers the received DHCP ACK 1011 to the DHCP processing unit 901 as a DHCP ACK 1012. After checking the DHCP ACK 1012, the DHCP processing unit 901 performs the network setting for the own apparatus based on the selected value, and ends the processing.

By the processing described above, the network setting for the printer 101 can be performed using the DHCP.

FIG. 11 is a flowchart illustrating a series of processing performed by the configurator control unit 313 to stop the supply of the packet to the configurator 311. Each operation described in the flowchart illustrated in FIG. 11 can be realized when the CPU 211 of the printer 101 executes the control program. In the flowchart illustrated in FIG. 11, in place of steps S804 and S805 in the flowchart illustrated in FIG. 8, processing in step S1011 is added.

In step S801, it is determined whether a packet has been received. When the packet has been received (YES in step S801), the processing proceeds to step S802. If not (NO in step S801), the processing waits in step S801 until the packet is received.

In step S802, whether to supply the packet to the configurator 311 is determined by determining whether a supply flag is set to ON or OFF. After the power supply of the printer 101 is turned on, since the supply of the packet to the configurator 311 is not stopped, the supply flag is set to ON. However, in step S807 that will be described below, when the supply of the packet to the configurator 311 is stopped, the supply flag is set to OFF.

If the supply of the packet to the configurator 311 is stopped in step S807, when the power supply of the printer 101 is once turned off and then turned on again, the supply flag is returned to the ON state. Therefore, by turning on the power supply of the printer 101 again, the supply of the packet to the configurator 311 can be resumed. With this arrangement, the network setting using the configurator 311 can be changed.

As a result of the determination in step S802, if it is determined that the packet is to be supplied to the configurator 311 (YES in step S802), the processing proceeds to step S803. On the other hand, if it is determined that the packet is not to be supplied to the configurator 311 (NO in step S802), the processing proceeds to step S808 and the received packet is supplied (transferred) only to the UDP/TCP processing unit 312. In this case, the supply (transfer) of the packet to the configurator 311 is not performed.

In step S803, the received packet is duplicated. In the following step S1101, it is determined whether the received packet is the DHCP ACK included in the packet group which is transmitted or received via the DHCP. As a result of the determination, if it is determined that the received packet is not the DHCP ACK (NO in step S1101), then in step S806, the received packet is supplied (transferred) to the configurator 311, and in step S808, the received packet is further supplied (transferred) to the UDP/TCP processing unit 312.

As a result of the determination in step S1101, if it is determined that the received packet is the DHCP ACK (YES in step S1101), the processing proceeds to step S807 and the supply flag is set to OFF. Accordingly, the supply (transfer) of the received packet to the configurator 311 is stopped. The processing, then, proceeds to step S808 and supplies (transfers) the received packet only to the UDP/TCP processing unit 312. In this case, since the supply (transfer) of the packet to the configurator 311 is not performed, the duplicated packet is discarded.

By the processing described above, it can be set so that the configurator 311 does not analyze the received packet, when it is determined that the network setting has been completed. With this arrangement, the processing load of the printer 101 (control unit 210) can be reduced.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-068287 filed Mar. 24, 2010, which is hereby incorporated by reference herein in its entirety.

What is claimed is:

1. A communication apparatus comprising:
a reception unit configured to receive a packet transmitted from an external apparatus on a network;
a setting unit configured to set an IP address of the communication apparatus, based on a setting packet received by the reception unit; and
a controlling unit configured to maintain the setting unit in an enable state until the reception unit receives a predetermined packet, a type of which is different from a type of the setting packet, and put the setting unit into a disable state on condition that the reception unit receives the predetermined packet,
wherein the setting unit sets the IP address of the communication apparatus based on the setting packet received by the reception unit while the controlling unit maintains the setting unit in the enable state, and wherein the setting unit does not set the IP address of the communication apparatus, after the controlling unit puts the setting unit into the disable state, even if the reception unit receives the setting packet.

2. A communication method comprising:
receiving a packet transmitted from an external apparatus on a network;
setting IP address of a communication apparatus, based on the received setting packet; and
controlling to maintain the setting in an enable state until the receiving receives a predetermined packet, a type of which is different from a type of the setting packet, and putting the setting into a disable state on condition that the receiving receives the predetermined packet,
wherein the setting sets the IP address of the communication apparatus based on the setting packet received while the controlling maintains the setting in the enable state, and
wherein the setting does not set the IP address of the communication apparatus, after the controlling puts the setting into the disable state, even if the receiving receives the setting packet.

3. A non-transitory computer readable medium for storing a computer-executable program of instructions for causing a computer to perform a communication method comprising:
receiving a packet transmitted from an external apparatus on a network;
setting an IP address of a communication apparatus, based on the received setting packet; and
controlling to maintain the setting in an enable state until the receiving receives a predetermined packet, a type of which is different from a type of the setting packet, and put the setting into a disable state on condition that the receiving receives the predetermined packet,
wherein the setting sets the IP address of the communication apparatus based on the setting packet received while the controlling maintains the setting in the enable state, and
wherein the setting does not set the IP address of the communication apparatus, after the controlling puts the setting into the disable state, even if the receiving receives the setting packet.

4. The communication apparatus according to claim 1, further comprising:
a supply unit configured to supply the setting packet received by the reception unit to the setting unit according to a supply flag,
wherein the supply flag is in an ON state in the enable state of the setting unit, and the supply flag is in an OFF state in the disable state of the setting unit.

5. The communication apparatus according to claim 1, wherein the communication apparatus is a printing apparatus capable of performing printing processing.

6. The communication apparatus according to claim 1, wherein the controlling unit determines whether or not a packet received by the reception unit is the setting packet, based on identification information included in the packet received by the reception unit.

7. The communication apparatus according to claim 6,
wherein the identification information is port information, and
wherein, in a case where the port information indicates a specific port, the controlling unit determines that the packet received by the reception unit is the setting packet.

8. The communication apparatus according to claim 1, wherein the controlling unit returns the setting unit from the disable state to the enable state if the communication apparatus is turned on again.

9. A communication apparatus comprising:
a reception unit configured to receive a packet transmitted from an external apparatus on a network;
a setting unit configured to set an IP address of the communication apparatus, based on a setting packet received by the reception unit; and
a controlling unit configured to, in a case where the reception unit receives a packet of which a destination MAC address corresponds to a MAC address of the communication apparatus and is different from the setting packet, change a state of the communication apparatus from an enable state in which the setting unit sets the IP address of the communication apparatus to a disable state in which the setting unit does not set the IP address of the communication apparatus,
wherein in a case where the communication apparatus is in the enable state, the setting unit sets the IP address of the communication apparatus based on the setting packet received by the reception unit, and
wherein in a case where the communication apparatus is in the disable state, even if the reception unit receives the setting packet, the setting unit does not set the IP address of the communication apparatus based on the setting packet received by the reception unit.

10. The communication apparatus according to claim 9, further comprising:
a supply unit configured to supply the setting packet received by the reception unit to the setting unit,
wherein in a case where the communication apparatus is in the enable state, the supply unit supplies the setting packet to the setting unit, and
in a case where the communication apparatus is in the disable state, the supply unit does not supply the setting packet to the setting unit.

11. The communication apparatus according to claim 9, wherein the communication apparatus is a printing apparatus capable of performing printing processing.

12. The communication apparatus according to claim 9, wherein in a case where the communication apparatus restarts, the controlling unit sets the communication apparatus such that the communication apparatus is put in the enable state.

13. A communication method of a communication apparatus comprising:
receiving a packet transmitted from an external apparatus on a network;
setting an IP address of the communication apparatus, based on a setting packet received by the receiving; and
changing, in a case where the receiving receives a packet of which a destination MAC address corresponds to a MAC address of the communication apparatus and is different from the setting packet, a state of the communication apparatus from an enable state in which the setting sets the IP address of the communication apparatus to a disable state in which the setting does not set the IP address of the communication apparatus,
wherein in a case where the communication apparatus is in the enable state, the setting sets the IP address of the communication apparatus based on the received setting packet, and
wherein in a case where the communication apparatus is in the disable state, even if the receiving receives the setting packet, the setting does not set the IP address of the communication apparatus based on the received setting packet.

14. A non-transitory computer readable medium for storing a computer-executable program of instructions for causing a computer to perform a communication method of a communication apparatus comprising:

receiving a packet transmitted from an external apparatus on a network;

setting an IP address of the communication apparatus, based on a setting packet received by the receiving; and changing, in a case where the receiving receives a packet of which a destination MAC address corresponds to a MAC address of the communication apparatus and is different from the setting packet, a state of the communication apparatus from an enable state in which the setting sets the IP address of the communication apparatus to a disable state in which the setting does not set the IP address of the communication apparatus, wherein in a case where the communication apparatus is in the enable state, the setting sets the IP address of the communication apparatus based on the received setting packet, and wherein in a case where the communication apparatus is in the disable state, even if the receiving receives the setting packet, the setting does not set the IP address of the communication apparatus based on the received setting packet.

* * * * *